United States Patent [19]  [11] 4,199,925
Quick et al.  [45] Apr. 29, 1980

[54] CROP HARVESTING MACHINE

[75] Inventors: Graeme R. Quick, Lilydale, Australia; Walter E. Harris, Brantford, Canada; Ernest J. Riddle, Burford, Canada; Terrence S. Robinson, Harley, Canada

[73] Assignee: White Motor Corporation of Canada Ltd., Brantford, Canada

[21] Appl. No.: 874,122

[22] Filed: Feb. 1, 1978

[30] Foreign Application Priority Data

Feb. 7, 1979 [CA] Canada .................................. 271234

[51] Int. Cl.² ............................................. A01D 67/00
[52] U.S. Cl. ..................................................... 56/208
[58] Field of Search ...................... 56/10.2, 14.9, 15.7, 56/15.8, 15.9, 208

[56] References Cited

U.S. PATENT DOCUMENTS

| 3,747,311 | 7/1973 | DeCoene et al. ........................ 56/208 |
| 3,848,401 | 11/1974 | Hast ........................................ 56/296 |
| 3,886,718 | 6/1975 | Talbot ..................................... 56/208 |

Primary Examiner—Russell R. Kinsey
Attorney, Agent, or Firm—Lockwood, Dewey, Alex & Cummings

[57] ABSTRACT

A support system and height control mechanism for a flexible floating cutterbar to be used on a crop harvesting machine. The support system includes counterbalancing shoe support springs that are easily adjustable to regulate the lifting pressure for the cutterbar head by the use of a conventional tool. The height control mechanism is especially useful for the header of a machine having a flexible floating cutterbar mounted on the header where a cutterbar can follow the contour of the land wherein the highest point along the cutterbar is sensed and will control the height adjustment for the header. Sensor fingers along the bar back of the cutterbar are connected through a lost motion connection to a control for adjusting the height of the cutterbar in accordance with the contour of the land being harvested.

9 Claims, 5 Drawing Figures

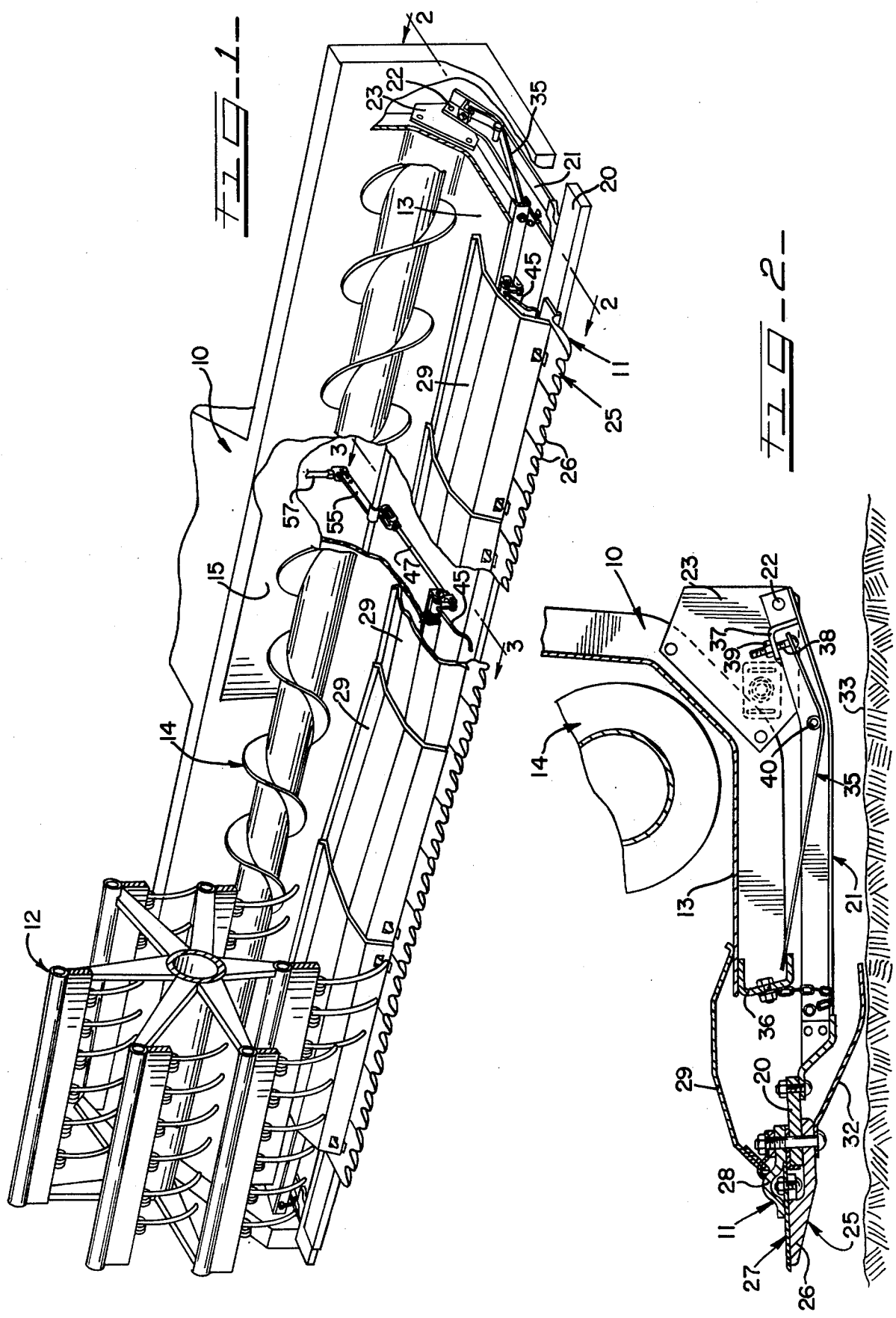

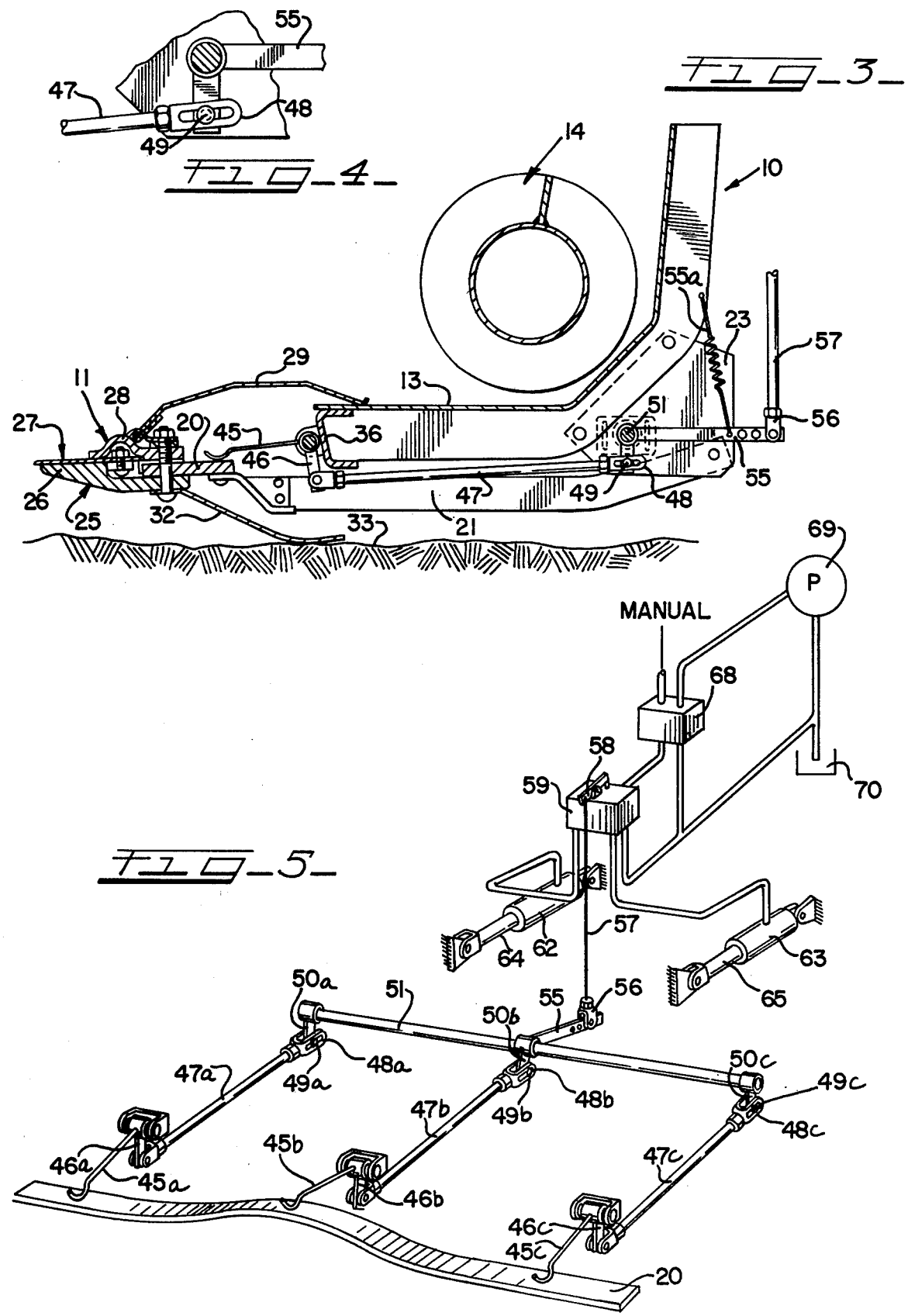

CROP HARVESTING MACHINE

This invention relates in general to a crop harvesting machine, and more particularly to a crop harvesting machine having a flexible floating cutterbar. The crop harvesting machine may be a combine, a swather or a mower, and more particularly the invention relates to a support system and a height control mechanism for a flexible floating cutterbar to enhance the efficiency of harvesting low-growing crops.

One of the features of this invention concerns the support system for the cutterbar. The cutterbar is flexible along its length, so that when the cutterbar travels over uneven ground it will conform to the contour of the ground. Further, the cutterbar is floatingly mounted to the header of the crop harvesting machine to additionally allow it to conform to the contour of the ground during the harvesting action. The flexible floating cutterbar arrangement is particularly useful for cutting low-growing crops such as soybeans, whereby it is essentially necessary to cut the stems as low as possible over uneven ground. Accordingly, the cutterbar must move relative the header of the machine so that it can accomplish uniform cutting of the crop close to the ground along the entire length of the cutterbar.

It is conventional to provide counterbalancing means for floatingly supporting a cutterbar on the header. It is further conventional to use shoe support springs which are elongated leaf-type springs arranged at spaced points along the cutterbar for defining the floating connection between the cutterbar and the header. It is necessary to adjust the shoe support springs from time to time in order to define the proper counterbalancing action for the cutterbar. Heretofore, it has been difficult to effect the adjustment of the shoe support springs, thereby necessitating the shut-down of the machine for a period of time until the adjustment can be completed. Some arrangements have also required the use of special tools. One type of shoe spring support arrangement is shown in U.S. Pat. No. 3,896,610. Other known types use adjustable spring clips which are movable along the shoe support springs but which require special handling of the cutterbar in order to effect the necessary adjustment. Such an arrangement is made by Hart-Carter of Mendota, Illinois.

Accordingly, it is an object of the present invention to provide a shoe spring support arrangement that can be easily and quickly adjusted in the field by the machine operator to provide the proper counterbalancing force between the header and the cutterbar.

A further object of this invention is to provide a new and improved supporting arrangement for a cutterbar which counterbalances the weight of the cutterbar and may be easily adjusted by the use of a conventional nut wrench to provide the desired lifting pressure on the cutterbar assembly.

Another feature of the invention is in the height control mechanism for controlling the height of the header during the harvesting action. It is important that the header be elevated at times during the movement of the machine over uneven ground in order to avoid damage of the machine and particularly the header or the cutterbar when encountering an unusually high obstruction such as a rock. Heretofore, it has been known to automatically control the height of the header by sensing the position of the skid shoes of the cutterbar, which is objectionable because such is not as accurate as needed at certain times.

The height control mechanism of the present invention obviates the difficulties heretofore known and senses the position of the cutterbar from the bar back and utilizes a unique lost motion connection between the sensor fingers and the control for more accurately sensing the position of the cutterbar head.

Accordingly, it is a further object of this invention to provide a new and improved height control mechanism for a cutterbar on a crop harvesting machine which senses the position of the cutterbar head from the bar back and which utilizes a lost motion action between the sensors and the control of the height control mechanism to more accurately measure the position of the cutterbar head.

Another object of the present invention is to provide a new and improved height control mechanism for a cutterbar which more greatly protects the header and cutterbar against damage during the harvesting action.

Other objects, features and advantages of the invention will be apparent from the following detailed disclosure, taken in conjunction with the accompanying sheets of drawings, wherein like reference numerals refer to like parts, in which:

FIG. 1 is a perspective view of the header of a crop harvesting machine such as a combine having a flexible floating cutterbar mounted on the header with adjustable shoe support springs according to the invention and with a height control mechanism according to the invention and with some parts broken away in order to show underlying parts for purposes of clarity;

FIG. 2 is an enlarged side elevational view of the header and cutterbar arrangement shown in FIG. 1 with some parts shown in section and taken generally along line 2—2 of FIG. 1;

FIG. 3 is a vertical cross-sectional view of the header and cutterbar assembly taken substantially along line 3—3 of FIG. 1;

FIG. 4 is a greatly enlarged fragmentary view of a portion of the height control mechanism and particularly the lost motion connection linkage which is essential to the novelty of the height control mechanism of the present invention; and FIG. 5 is a perspective schematic or diagrammatic view of the height control mechanism according to the present invention.

Referring now to the drawings, and particularly to FIG. 1, a header for a crop harvesting machine such as a combine is shown and generally indicated by the numeral 10. A cutterbar 11 is floatingly supported by the header 10 and lengthwise is flexible in order to follow the contour of the ground. During a harvesting action by the combine, the header normally remains in the same location relative to the ground and within limits the cutterbar will float toward and away from the header in accordance with the contour of the ground. As the combine moves along a field of crops, the crop is severed at the stem by the cutterbar 11 and a reel 12 assists in moving the cut crop onto the apron 13 of the header to a collecting auger 14 which delivers the crop toward the center of the header and to a chute 15 and into the combine for further processing. Inasmuch as the cutterbar can flex along its length and it can float relative the header, it will travel closely over uneven ground to conform to the contour of the ground and cut the crop at a point along the crop stem very close to the ground.

The cutterbar 11, as seen in FIGS. 1, 2 and 3, generally includes an elongated bar back 20 in the form of an elongated continuous bar extending across the width of the header which is connected to and supported from the header by a plurality of support arms 21. As seen most clearly in FIGS. 2 and 3, the bar back is fastened to the forward ends of the support arms 21, while the rearward ends are pivotally mounted on a pivot 22 to a bracket or flange 23 that is connected to the header 10. Accordingly, the rearward ends of the support arms are pivotally attached to the header and thereby pivotally support the cutterbar 11 to the header.

A guard 25 in the form of a plurality of sections 26 is fastened to the bar back 20 and a sickle bar or knife bar 27 is reciprocably supported on the bar back and guard. A plurality of holddown clips 28, which may be rigid or of the spring-loaded type, are arranged in spaced relation along the cutterbar and fastened to the bar back to hold the sickle bar in place and prevent it from moving upwardly relative to the guard. A plurality of feeder or feather shields 29 are also supported on the cutterbar and coact therewith to provide crop flow toward the collecting auger 14. Further, the feather shield 29 serves to protect the mounting hardware of the cutterbar. The shields are hingedly supported on the cutterbar, thereby allowing upward and downward movement of the shield as the cutterbar moves upward or downward relative the header. Further, the hinging of the shields allows access to the cutterbar hardware when swung open.

A plurality of ground or shoe skids 32 are mounted on the underside of the cutterbar 11 for engagement with the ground and for spacing the cutterbar at a substantially uniform position relative the ground as the combine moves over uneven ground, as it may be noted that the skids 32 engage the ground designated by the numeral 33 in FIGS. 2 and 3.

A unique feature of the invention is in the manner in which the cutterbar is floatingly mounted on the header. Referring particularly to FIGS. 1, 2 and 3, it will be noted that the cutterbar is supported by a plurality of support arms 21 when the cutterbar is mounted at the forward ends of the arms and the rearward ends of the arms are pivotally mounted on the header 10. In order to counterbalance the weight of the cutterbar, a plurality of shoe support springs 35 in the form of conventional leaf-springs are provided and connected between the support arms 21 and the header.

The forward ends of the shoe support springs are restrained by a channel member 36 which extends along the front edge of the header apron 13. This restrainment prevents the downward movement of the forward end of the support springs relative the header. The rearward ends of the shoe support springs are connected to brackets 37 on the rearward end of the support arms adjacent the pivots by means of a bolt 38 and a nut 39. The bolt is received freely in an opening in the bracket 37 whereby rotation of the nut 39 will cause movement of the rearward end of the shoe support spring toward and away from the bracket 37. The intermediate portion of the shoe support springs are restrained relative the shoe support arms by means of a fulcrum or pin 40 whereby a lifting pressure is applied to the fulcrum 40 and thereby to the support arms. This fulcrum is positioned closer to the rearward end of the spring. Accordingly, the shoe support spring effects a counter-balancing action relative the cutterbar in an upward lifting force thereon so that it will float and easily move upwardly and downwardly relative the header as the cutterbar moves over uneven ground.

In order to change the lifting force of the spring for the cutterbar, it is only necessary to use a conventional nut wrench on the nut 39 to move the respective end of the shoe support spring toward or away from the bracket 37. Accordingly, it is very easy to adjust the lifting pressure and therefore adjust the floating action for the cutterbar. It should further be realized this can be done in the field and it is not necessary to bring the combine into a service area for changing the lifting pressure of the springs.

The automatic height control mechanism of the invention functions to raise and lower the header in response to the relative location or spacing between the header and the cutterbar during the harvesting action. The cutterbar position is established by engagement of the ground skids with the ground, and should a part of the cutterbar be elevated a sufficient amount such as due to the encountering of a rock or high obstruction on the ground, it imparts a signal to the height control mechanism for automatically elevating the header to a position such that it can clear the obstruction. Heretofore, sensing of the position of the cutterbar has been accomplished by sensing the position of the ground skids. It should be appreciated that the ground skids are of a spring-like material so that there is some give between the skids and the cutterbar and there may be some lag in signaling an obstruction where the signal is taken from the ground skids. The height control mechanism of the present invention senses the position of the cutterbar by having sensor fingers arranged in engagement with the bar back of the cutterbar. Further, by incorporating a unique lost motion connection, the height control mechanism responds to whichever sensor finger senses the highest point along the cutterbar.

The diagrammatic showing of the height control mechanism in FIG. 5 includes three sensor fingers 45a, 45b and 45c, the free ends of which engage the upper side of the bar back 20 of the cutterbar. It can be appreciated that any number of sensor fingers may be provided along the cutterbar and the number may depend upon the length of the cutterbar. It is essentially important to sense the representative position of the cutterbar at various areas inasmuch as it will flex between its ends. The fingers are secured to levers 46a, 46b and 46c respectively which are pivotally mounted on pins held by brackets at the header channel member 36. Accordingly, the sensor fingers are pivotally mounted to the header 10. The levers extend downwardly and are pivotally connected to lost motion links 47a, 47b and 47c, each of which is provided at its output end with bifurcated and longitudinally slotted connectors 48a, 48b and 48c. It will be appreciated the input ends of the links are connected to the levers to which the sensor fingers are mounted. The slots of the connectors 48 receive pins 49a, 49b and 49c carried on the lower ends of levers 50a, 50b and 50c, all of which are secured to and rotatable with a cross shaft 51. Accordingly, the cross shaft 51 is driven by any one or all of the sensor fingers when a pin 49 of a lever 50 engages the rearward end of a slot in a link connector 48 such as illustrated by the pin 49b in the slot of connector 48b.

An actuating bar 55 is suitably connected to the cross shaft 51 for movement therewith and a tension spring 55a extends between the bar and the header. The actuating bar extends at right angles to the cross shaft and as illustrated may be connected to any one of the levers 50 and as shown is connected to the lever 50b. Adjacent the free end of the actuating bar 50, a plurality of holes are provided for connecting thereto a clevis 56 at a desired hole that in turn is connected to a cable 57 which in turn is connected to a valve actuating lever 58 on the height control valve 59. Accordingly, the height control valve 59 operates as a control for the height control mechanism.

The actuating lever 58 is associated with the valve 59 to control operation of a pair of hydraulic cylinders 62 and 63 which are suitably mounted on the frame of the machine. The cylinders include piston rods 64 and 65 respectively, which are in turn suitably connected to the header 10. It will be appreciated the header 10 is suitably mounted on the frame of the machine or combine so that it can be raised or lowered relative the frame and cylinders 62 and 63 accomplish the raising and lowering functions. Any other type of power means may be used to effect these functions. High pressure hydraulic fluid is supplied to the valve 59 through suitable lines and through a manual valve 68 by means of a pump 69 which also functions with a reservoir 70. While the cylinders 62 and 63 are shown to be single-acting, they could be double-acting if so desired, and suitable lines lead from the valve 59 to the cylinders for supplying same with hydraulic fluid.

In operation, the height control mechanism functions to automatically maintain a position of the header 10 to clear any obstructions during the harvesting action where movement of the floating cutterbar 11 is sensed by the sensor fingers 45 which signals the height control valve 59 for causing the proper positioning of the header. The lost motion connection in the linkage between the sensor fingers and the height control valve 59 allows only the sensor finger sensing the highest point along the cutterbar to control movement of the header 10. The height control valve 59 would be programmed so that following the manual setting of the positioning of the header 10 by the manual valve 68, the header would be elevated during harvesting when necessary automatically during the passing of an obstruction and thereafter lowered to the position which would have been preset. Further, it can be appreciated that the manual valve 68 would override the automatic valve 59 such as for travel along the highway where it would be desired the header to be elevated to a suitable position.

It may be further appreciated that the mechanism for sensing the position of the cutterbar by virtue of the fingers engaging the bar back is maximally elevated from the ground level to prevent interference in operation with the ground and also to assist in preventing contamination of the linkage and malfunction by debris along the ground. The linkage is further protected from the flow of crops by being positioned below the apron of the header and below the feather shields so as to give the best possible and most efficient operation. A more accurate positioning of the header is accomplished than heretofore possible when the sensors engage the skid shoes of the cutterbar.

It will be understood that modifications and variations may be effected without departing from the scope of the novel concepts of the present invention, but it is understood that this application is to be limited only by the scope of the appended claims.

The invention is hereby claimed as follows:

1. A crop harvesting machine comprising, a header, a floating cutterbar, and means for supporting the cutterbar on the header including generally horizontally extending support arms for the cutterbar having the cutterbar mounted at the forward ends thereof, pivot means at the rearward ends of said support arms pivotally connecting the arms to the header, a support spring for each support arm extending from near the rearward end of the support arm and forwardly thereof to apply a lifting force to the cutterbar through the support arms, means on the header holding the forward end of the spring against downward movement, adjustable means on the support arm adjacent the rearward end thereof connecting the rearward end of the spring thereto, and fulcrum means on the support arm resting on the spring intermediate its ends thereof, whereby the support springs counterbalance the cutterbar.

2. A crop harvesting machine as defined in claim 1, wherein said fulcrum means is located on the support arm closer to the rearward end of the spring than to the front end.

3. A crop harvesting machine as defined in claim 1, wherein said adjustable means includes a nut and bolt assembly coacting with the spring and a bracket on the support arm, whereby adjusting of the nut and bolt assembly adjusts the lifting force applicable to the cutterbar.

4. A crop harvesting machine comprising, a main frame, a header mounted on the frame for movement toward and away from the ground, power means operable to move the header relative the frame and upwardly and downwardly relative the ground, a flexible floating cutterbar floatingly supported on the header for travel over uneven ground and conformable to the contour thereof, and a height control mechanism for automatically controlling the height of the header through operation of said power means in response to the position of the cutterbar relative the header, said height control mechanism including a control for operating the power means, a plurality of movable sensor fingers mounted on the header and engaging the cutterbar along its length, and lost motion connection means between each of the fingers and said control operable whereby the finger sensing the highest point along the cutterbar actuates said control.

5. A crop harvesting machine as defined in claim 4, wherein, fingers are pivotally mounted on the header, and said lost motion connection means includes a cross shaft having lost motion levers secured thereon for movement therewith, and lost motion links interconnecting said fingers and said levers.

6. A crop harvesting machine as defined in claim 5, wherein said lost motion links include slotted connectors coacting with pins on the lost motion levers.

7. A crop harvesting machine as defined in claim 6, wherein said power means includes hydraulic cylinders, and said control includes a hydraulic valve connected to the cylinders.

8. A crop harvesting machine as defined in claim 7, wherein said machine further comprises a manual valve for said cylinders to manually set the position of the header.

9. A crop harvesting machine as defined in claim 4, wherein the cutterbar is supported by a plurality of support arms pivotally connected to the header and a support spring for each support arm extending from near the rearward end of the support arm and forwardly thereof to apply a lifting force to the cutterbar through the support arms, means on the header holding the forward end of the spring against downward movement, adjustable means on the support arm adjacent the rearward end thereof connecting the rearward end of the spring thereto, and fulcrum means on the support arm resting on the spring intermediate its ends thereof, whereby the support springs counterbalance the cutterbar.

* * * * *